United States Patent
Kameta et al.

(10) Patent No.: US 9,751,178 B2
(45) Date of Patent: Sep. 5, 2017

(54) SERVO CONTROL APPARATUS HAVING FUNCTION OF SENSORLESS CONTROLLED STOP

(71) Applicant: FANUC CORPORATION, Minamitsuru-gun, Yamanashi (JP)

(72) Inventors: Kouki Kameta, Yamanashi (JP); Naoto Sonoda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/145,994

(22) Filed: May 4, 2016

(65) Prior Publication Data

US 2016/0334760 A1    Nov. 17, 2016

(30) Foreign Application Priority Data

May 11, 2015  (JP) .................... 2015-096916

(51) Int. Cl.
*H02P 6/18*  (2016.01)
*B23Q 5/58*  (2006.01)
(Continued)

(52) U.S. Cl.
CPC ............. *B23Q 5/58* (2013.01); *B23Q 5/10* (2013.01); *G05B 19/4062* (2013.01); *G05B 2219/42329* (2013.01)

(58) Field of Classification Search
CPC .................................................. B60L 3/0038
(Continued)

(56) References Cited

U.S. PATENT DOCUMENTS

2014/0111130 A1* 4/2014 Yamada ............... B60L 3/0038
                                                   318/400.32

FOREIGN PATENT DOCUMENTS

JP        10-277887      10/1998
JP      2011-112282 A    4/2001
(Continued)

OTHER PUBLICATIONS

Yamanaka, K., et al., "Sensorless phase-tracking control system for permanent-magnet synchronous motors," 2009, pp. 432-437, vol. 129(4), The Institute of Electrical Engineers of Japan (abstract only).
(Continued)

Primary Examiner — Jorge L Carrasquillo
Assistant Examiner — Cortez Cook
(74) Attorney, Agent, or Firm — RatnerPrestia

(57) ABSTRACT

A servo control apparatus includes a sensor unit for detecting a motor speed; an amplifier for driving a motor and feeding back a current; a magnetic pole position detector; a position controller for outputting a speed command; a speed controller for outputting a current command; a current controller for outputting a voltage command; a speed estimator for calculating an estimated speed from the voltage command; a magnetic pole position estimator for calculating an estimated magnetic pole position from the estimated speed; a sensor malfunction detector; a stop position command generator; and a first switch for switching from the position command to the stop position command, a second switch for switching from the magnetic pole position to the estimated magnetic pole position, and a third switch for switching from the detected speed to the estimated speed, when the sensor malfunction detector has detected a malfunction.

4 Claims, 9 Drawing Sheets

(51) Int. Cl.
*B23Q 5/10* (2006.01)
*G05B 19/4062* (2006.01)
(58) Field of Classification Search
USPC .................................................. 318/400.32
See application file for complete search history.

(56) References Cited

FOREIGN PATENT DOCUMENTS

| | | |
|---|---|---|
| JP | 2005-012997 | 1/2005 |
| JP | 2011-015601 A | 1/2011 |
| JP | 2011-067017 | 3/2011 |
| JP | 2013-258810 | 12/2013 |
| WO | 2007-126024 A1 | 11/2007 |

OTHER PUBLICATIONS

U.S. Notice of Allowance issued in U.S. Appl. No. 15/483,134 dated Jul. 21, 2017, 19 pages.

\* cited by examiner

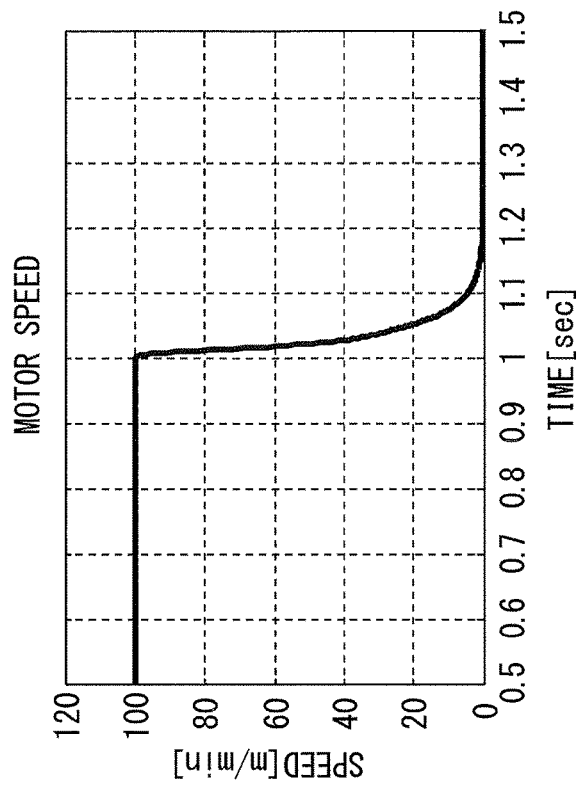
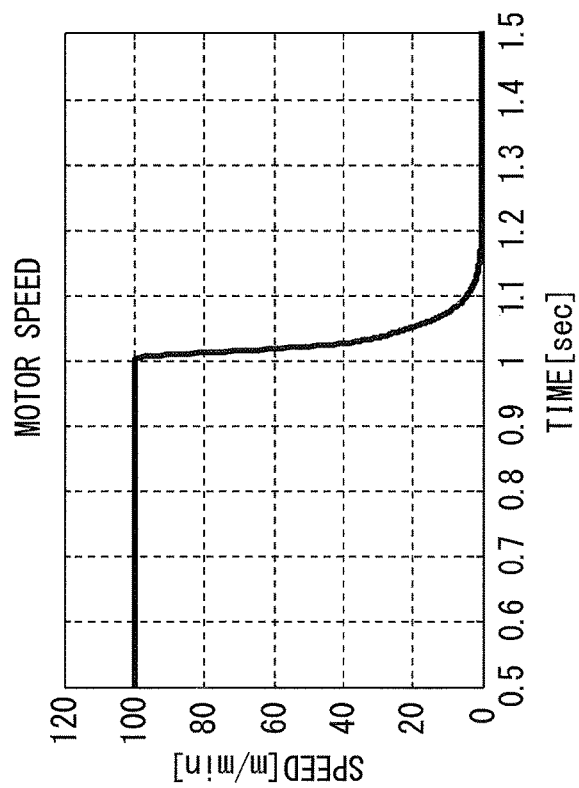

SERVO CONTROL APPARATUS HAVING FUNCTION OF SENSORLESS CONTROLLED STOP

BACKGROUND OF THE INVENTION

1. Field of the Invention

The present invention relates to a servo control apparatus for controlling a machine such as a machine tool using a servomotor, and specifically relates to a servo control apparatus that enables a sensorless controlled stop safely in case a sensor malfunction occurs during the operation of the motor.

2. Description of Related Art

During the operation of servomotors (hereinafter also simply referred to as "motors") used in machines such as machine tools, in general, an alarm condition arises when a malfunction is caused in a sensor, and power to the motor is shut down. When the power is shutdown, the motor is stopped using a dynamic brake (DB) resistor. However, if the motor has a high inertia or is driven at a high speed, its stopping distance is excessive. As a result, the machine may be damaged due to a collision especially in a straight axis direction, thus posing danger.

On the other hand, a controlled stop is effective at shorting the stopping distance. The "controlled stop" refers to stopping the motor under control. However, conventional methods for the controlled stop cannot be used in the event of a sensor malfunction, because sensor information (position, speed, and magnetic pole position) from the motor is required. Therefore, it is desired to develop a sensorless controlled stop method. The "sensorless control" refers to feedback control of the motor based on estimated sensor information.

To detect a sensor malfunction, there are cases where the sensor detects the malfunction or a servo control apparatus that receives the sensor information detects the malfunction. For example, the sensor detects a malfunction due to a pulse miss count or the like detected by an internal circuit of the sensor. On the other hand, the servo control apparatus detects a malfunction due to a pulse dropout or the like occurring after the transmission of the sensor information.

FIG. 1 is a configuration diagram of a general servo control apparatus. The servo control apparatus' 1000 includes a position controller 1004, a speed controller 1005, a current controller 1006, a first coordinate converter 1015, a second coordinate converter 1016, an amplifier 1002, a sensor unit 1001, and a magnetic pole position detector 1003. The position controller 1004 outputs a speed command based on a position command from an upper level control apparatus 1020 and position feedback (FB). To obtain the position FB, an integrator 1014 integrates a motor speed (speed FB) detected by the sensor unit 1001 provided in the vicinity of a motor 1030.

The speed controller 1005 outputs a current command based on the speed command from the position controller 1004 and the speed FB. The current controller 1006 outputs a voltage command based on the current command from the speed controller 1005 and current FB. The current FB is outputted from the second coordinate converter 1016 based on a current value fed back by the amplifier 1002 and a magnetic pole position detected by the magnetic pole position detector 1003. The amplifier 1002 drives the motor 1030 based on the voltage command converted by the first coordinate converter 1015.

Sensor information about the motor 1030 detected by the sensor unit 1001 is fed back to the position controller 1004 as the position feedback (FB), and to the speed controller 1005 as the speed feedback (FB). Moreover, the sensor information is fed back to the current controller 1006 through the second coordinate converter 1016 as the current FB and used therein. In the case of using another scale, the position FB and the speed FB are based on sensor information from the scale.

As a method for sensorless control of permanent magnet synchronous motors, a method using a stator voltage phase is proposed (for example, Japanese Unexamined Patent Publication (Kokai) No. 2011-015601 hereinafter referred to as "patent literature 1", or "Sensorless Phase-Tracking Control System for Permanent-Magnet Motors" written by Kenji Yamanaka and Tokuo Onishi, published in IEEJ Transactions on Industry Applications Vol. 129, No. 4, pp. 432-437 (2009-4)). Patent literature 1 proposes that by making a stator voltage stably converge to a δ-axis in γδ coordinates (the γ-axial component of the stator voltage $V_\gamma=0$), a rotational speed ω is estimated from the δ-axial component of the stator voltage ($V_\delta$), and this allows sensorless control. Patent literature 1 also proposes a correction using a current command to improve a power factor, but its control method in which $V_\gamma=0$ is established is the same. Neither method aims at a controlled stop in the event of a sensor malfunction.

As measures for ensuring safety in the event of a sensor malfunction, a method for detecting the sensor malfunction and shifting to sensorless control using a magnetic pole position estimator is proposed (for example, Japanese Unexamined Patent Publication (Kokai) No. 2001-112282, hereinafter referred to as "patent literature 2"). The invention described in patent literature 2 is applicable to machines carrying people such as elevators and cars, and aims at keeping the machines moving to a safe position in a sensorless manner in the event of a failure, to prevent a sudden stop. However, it is preferable to stop machines such as machine tools as quickly as possible to avoid a collision.

SUMMARY OF THE INVENTION

To solve the above problems, an object of the present invention is to provide a servo control apparatus that switches to a method using voltage information, in the event of a sensor malfunction, and at the same time provides a stop position command or a deceleration command for a controlled stop.

A servo control apparatus according to an embodiment of the present invention is a servo control apparatus for controlling a servomotor installed in a machine tool or an industrial machine. The servo control apparatus includes a sensor unit for detecting the speed of the servomotor and outputting the speed as speed feedback; an amplifier for driving the servomotor, and also feeding back a current flowing through the servomotor; a magnetic pole position detector for detecting the magnetic pole position of the servomotor; a position controller for outputting a speed command based on a position command for the servomotor and the position of the servomotor calculated from the detected speed; a speed controller for outputting a current command based on the speed command and the detected speed; a current controller for outputting a voltage command based on the current command and the detected current; a speed estimator for calculating an estimated speed based on the voltage command; a magnetic pole position estimator for calculating an estimated magnetic pole position from the estimated speed; a sensor malfunction detector for detecting a malfunction in the sensor unit; a stop position command generator for generating a stop position command to stop the servomotor; a first switch for switching from the position command to the stop position command, when the sensor malfunction detector has detected the malfunction in the sensor unit; a second switch for switching from the magnetic pole position to the estimated magnetic pole position, when the sensor malfunction detector has detected the malfunction in the sensor unit; and a third switch for switching from the speed feedback to the estimated speed, when the sensor malfunction detector has detected the malfunction in the sensor unit.

BRIEF DESCRIPTION OF THE DRAWINGS

The objects, features, and advantages of the present invention will be more apparent from the following description of embodiments in conjunction with the attached drawings, wherein:

FIG. 8A is a graph showing a variation in a motor speed with time when the phase correction according to the conventional technique is performed;

FIG. 8B is a graph showing a variation in a motor speed with time when the phase correction according to the third embodiment of the present invention is performed;

DETAILED DESCRIPTION OF THE INVENTION

A servo control apparatus according to the present invention will be described below with reference to the drawings.

First Embodiment

Figure 1:
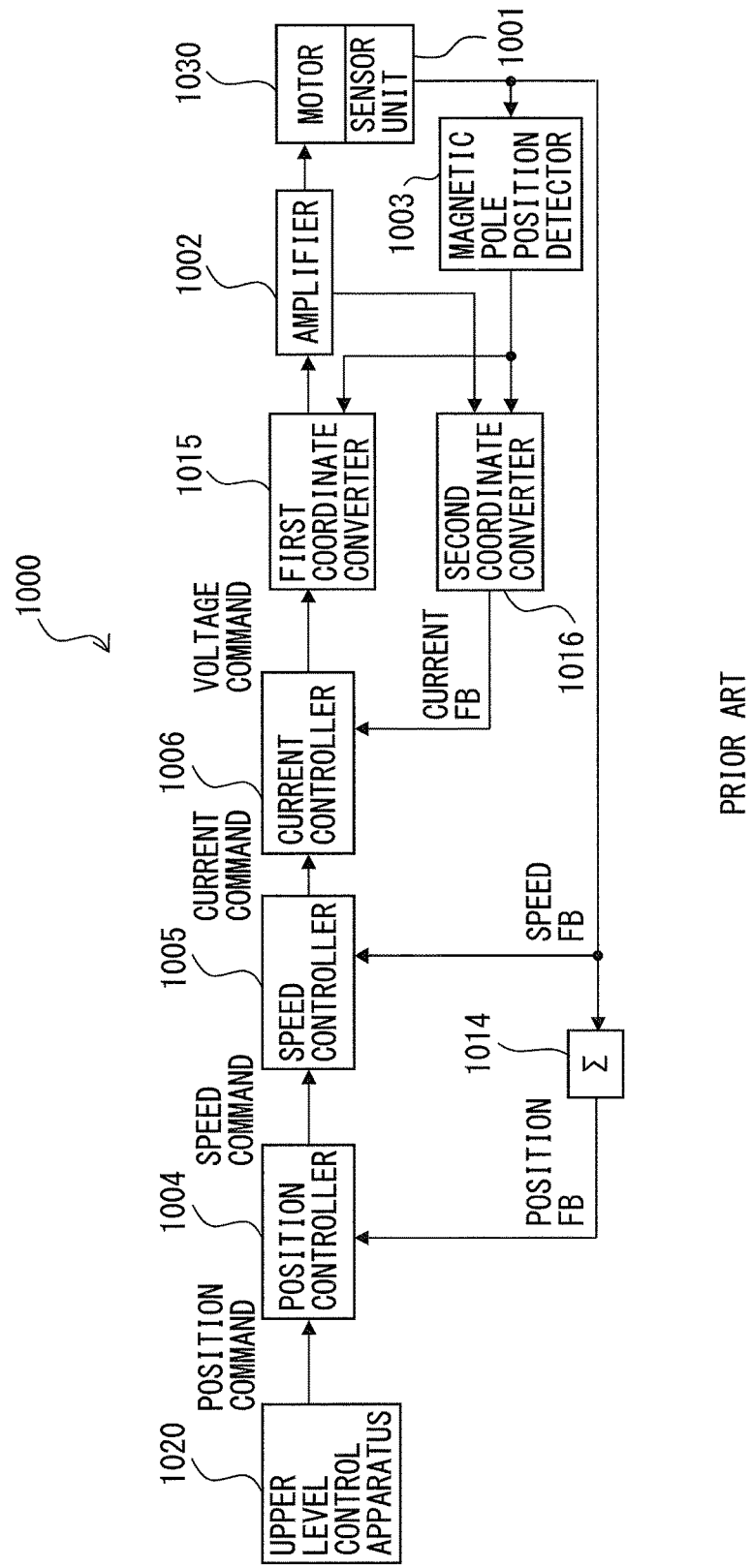
FIG. 1 is a configuration diagram of a conventional servo control apparatus.
Figure 2:
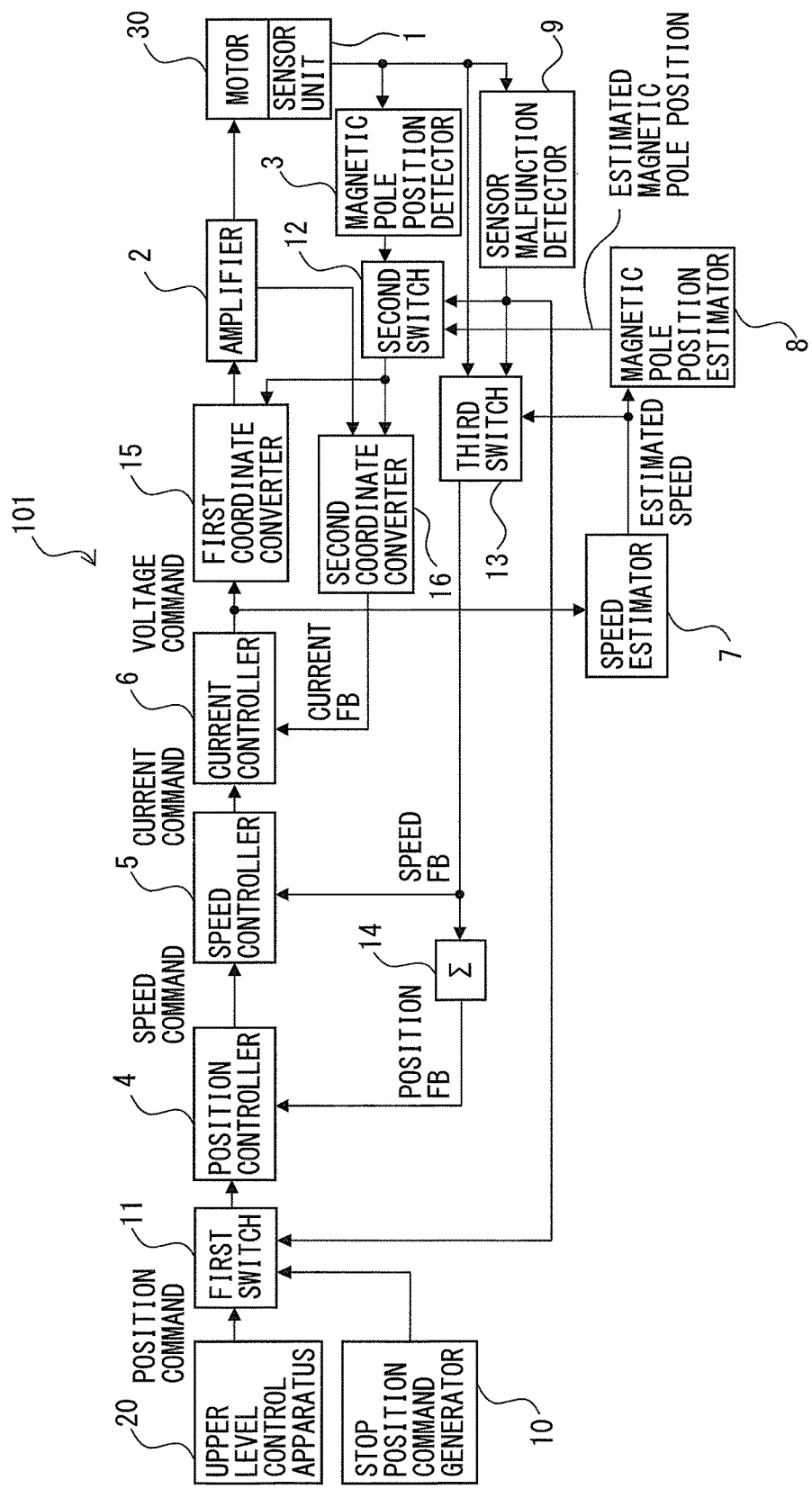
FIG. 2 is a configuration diagram of a servo control apparatus according to a first embodiment of the present invention.

A servo control apparatus according to a first embodiment of the present invention will be described. FIG. 2 is a configuration diagram of the servo control apparatus according to the first embodiment of the present invention. The servo control apparatus 101 according to the first embodiment of the present invention is a servo control apparatus for controlling a servomotor installed in a machine tool or an industrial machine. The servo control apparatus 101 includes a sensor unit 1, an amplifier 2, a magnetic pole position detector 3, a position controller 4, a speed controller 5, a current controller 6, a speed estimator 7, a magnetic pole position estimator 8, a sensor malfunction detector 9, a stop position command generator 10, a first switch 11, a second switch 12, and a third switch 13.

The sensor unit 1, which is provided in the vicinity of a servomotor 30 (hereinafter also referred to as "motor"), detects the speed of the servomotor 30 and outputs the detected speed as speed feedback. As the sensor unit 1, an angular sensor (resolver, optical type, or magnetic type) is available for calculating the number of revolutions from an angular variation.

While driving the servomotor 30, the amplifier 2 feeds back a current flowing through the servomotor 30.

The magnetic pole position detector 3 detects the magnetic pole position of the servomotor 30.

The position controller 4 outputs a speed command based on a position command for the servomotor 30 from an upper level control apparatus 20 and the position of the servomotor 30 calculated from the speed detected by the sensor unit 1.

The speed controller 5 outputs a current command based on the speed command from the position controller 4 and the speed detected by the sensor unit 1.

The current controller 6 outputs a voltage command based on the current command from the speed controller 5 and the current fed back by the amplifier 2.

The speed estimator 7 calculates an estimated speed based on the voltage command from the current controller 6.

The magnetic pole position estimator 8 calculates an estimated magnetic pole position based on the estimated speed from the speed estimator 7.

The sensor malfunction detector 9 detects a malfunction in the sensor unit 1. As the malfunction of the sensor unit 1, there are conceivable a case where a break in wiring of the sensor unit 1 disables reception of a detection signal, and the like. Alternatively, if the sensor unit has the function of detecting a malfunction inside, the sensor malfunction detector 9 can receive a malfunction detection signal directly from the sensor unit 1.

The stop position command generator 10 generates a stop position command to stop the servomotor 30. The stop position command may be stored in advance in a memory (not shown) provided in the stop position command generator 10.

The servo control apparatus 101 according to the first embodiment of the present invention is characterized in that when a malfunction in the sensor unit 1 has been detected, the position command is switched to the stop position command.

More specifically, when the sensor malfunction detector 9 has detected the malfunction in the sensor unit 1, the first switch 11 switches from the position command to the stop position command.

When the sensor malfunction detector 9 has detected the malfunction in the sensor unit 1, the second switch 12 switches from the magnetic pole position to the estimated magnetic pole position.

Furthermore, when the sensor malfunction detector 9 has detected the malfunction in the sensor unit 1, the third switch 13 switches from the speed feedback to the estimated speed.

The sensor malfunction detector 9 outputs the malfunction detection signal upon detecting the malfunction in the sensor unit 1.

The first switch 11, the second switch 12, and the third switch 13 can detect the malfunction in the sensor unit 1 by receiving the malfunction detection signal outputted from the sensor malfunction detector 9.

When the sensor malfunction detector 9 has detected the malfunction in the sensor unit 1, each of the switches 11 to 13 operates as follows:

(1) The magnetic pole position estimator 8 calculates the estimated magnetic pole position based on the estimated speed. The second switch 12 is switched so as to use the estimated magnetic pole position instead of the detected magnetic pole position contained in sensor information.

(2) The third switch 13 is switched so as to use the estimated speed as the speed FB instead of the speed contained in the sensor information detected by the sensor unit 1. The integral of the estimated speed is used as position FB.

(3) The first switch 11 is switched so as to use the stop position command generated by the stop position command generator 10 instead of the position command from the upper level control apparatus 20.

Since there is a possibility that a difference exists between a phase $\theta_1$ from the sensor information and a phase $\theta_2$ from the estimated speed at the time of switching, it is preferable that concurrently with the switching to the estimated speed, the value of the phase $\theta_1$ is used as an initial value of an estimated phase.

Figure 3:
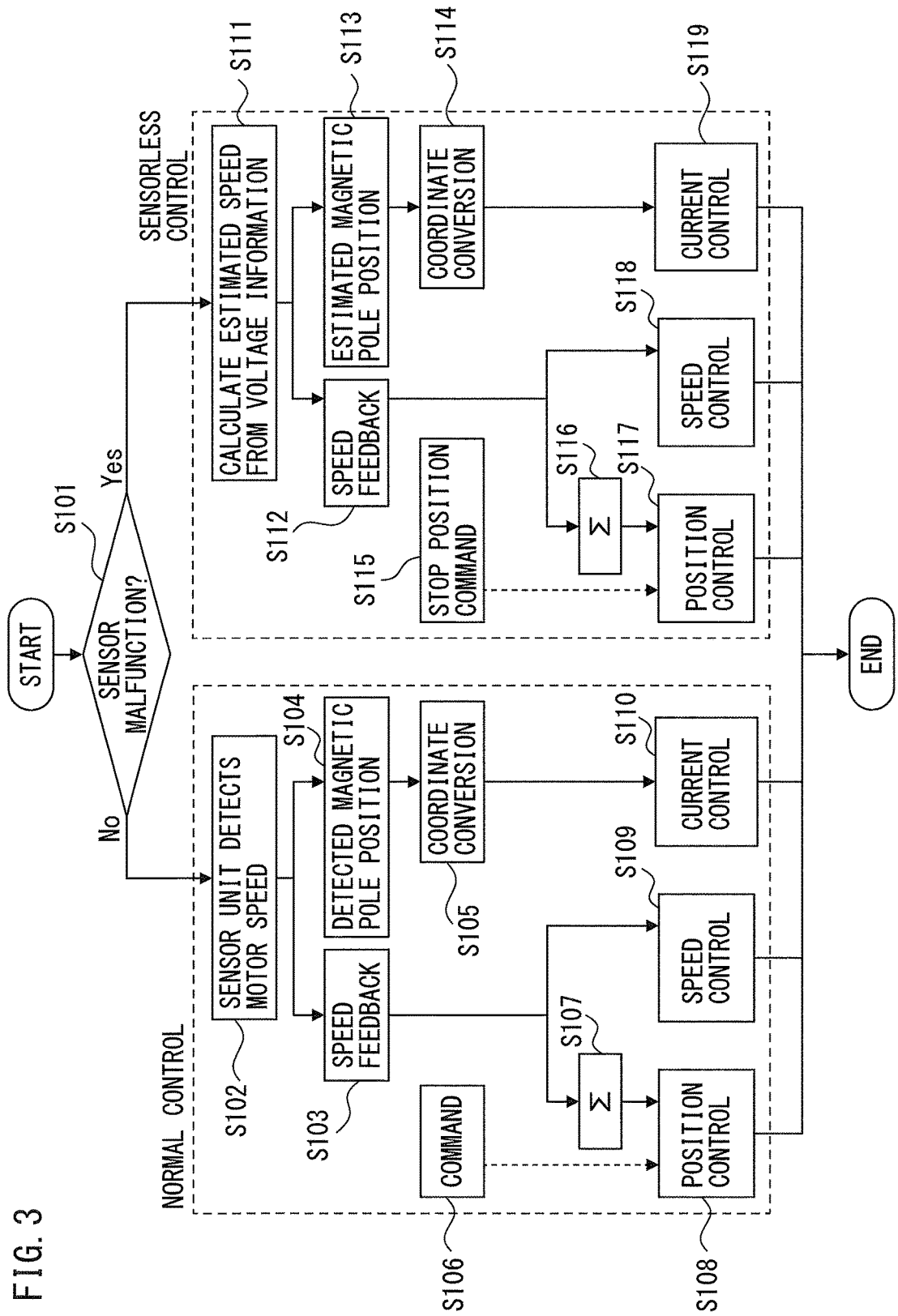
FIG. 3 is a flowchart that explains the operation process of the servo control apparatus according to the first embodiment of the present invention.

Next, the operation process of the servo control apparatus 101 according to the first embodiment of the present invention will be described with reference to a flowchart shown in FIG. 3.

First, in step S101, the sensor malfunction detector 9 (see FIG. 2) determines whether or not a malfunction occurs in the sensor unit 1. When no malfunction occurs in the sensor unit 1, normal servo control (normal control) is performed in steps S102 to S110. On the other hand, when the malfunction occurs in the sensor unit 1, sensorless control is performed in steps S111 to S119.

The normal control will be described. In step S102, the sensor unit 1 detects the speed of the motor 30. The detected speed is input to the third switch 13. In the normal control, the sensor malfunction detector 9 has detected no malfunction in the sensor unit 1, so that the third switch 13 outputs the detected speed as speed FB to the speed controller 5 in step S103. Then, in step S109, the speed controller 5 performs speed control.

Also, in step S107, the detected speed is inputted to an integrator 14 and outputted therefrom as position FB. Furthermore, in step S106, the upper level control apparatus 20 outputs a position command to the first switch 11. In the normal control, the sensor malfunction detector 9 has detected no malfunction in the sensor unit 1, so that the first switch 11 outputs the position command from the upper level control apparatus 20 to the position controller 4. Then, in step S108, the position controller 4 performs position control based on the position command and the position FB.

Also, in step S104, the magnetic pole position detector 3 detects a magnetic pole position from the speed detected by the sensor unit 1. The detected magnetic pole position is inputted to the second switch 12. In the normal control, the sensor malfunction detector 9 has detected no malfunction in the sensor unit 1, so that the second switch 12 outputs the detected magnetic pole position to a second coordinate converter 16. In step S105, the second coordinate converter 16 performs a coordinate conversion from a three-phase current into a dq current. Then, in step S110, the current after being subjected to the coordinate conversion is input to the current controller 6 as current FB, and the current controller 6 performs current control. The normal control is performed in this manner.

Next, the sensorless control performed by the servo control apparatus 101 according to the first embodiment of the present invention will be described. First, in step S111, the speed estimator 7 estimates a speed from a voltage command, i.e., voltage information, and outputs the estimated speed. The outputted estimated speed is inputted to the third switch 13. In the sensorless control, the sensor malfunction detector 9 has detected the malfunction in the sensor unit 1, so that in step S112 the third switch 13 outputs the estimated speed to the speed controller 5 as speed FB.

In step S116, the estimated speed is inputted to the integrator 14 as the speed FB, and outputted therefrom as position FB. Furthermore, in step S115, the stop position command generator 10 outputs a stop position command to the first switch 11. In the sensorless control, the sensor malfunction detector 9 detects the malfunction in the sensor unit 1. Then, the first switch 11 outputs the stop position command from the stop position command generator 10 to the position controller 4. Then, in step S117, the position controller 4 performs position control based on the stop position command and the position FB. Then, in step S118, the speed controller 5 performs speed control using the estimated speed as the speed FB.

Also in step S113, the magnetic pole position estimator 8 calculates an estimated magnetic pole position based on the estimated speed. The calculated estimated magnetic pole position is inputted to the second switch 12. In the sensorless control, the sensor malfunction detector 9 has detected the malfunction in the sensor unit 1, so that the second switch 12 outputs the estimated magnetic pole position to the second coordinate converter 16. In step S114, the second coordinate converter 16 performs a coordinate conversion from a three-phase current into a dq current. Then, in step S119, the current after being subjected to the coordinate conversion is inputted to the current controller 6 as current FB, and current control is performed. The sensorless control is performed in this manner.

As described above, according to the servo control apparatus of the first embodiment of the present invention, even in the event of the sensor malfunction, the speed of the motor is estimated from the voltage information to use the value of the estimated speed instead of the sensor information (position, speed, and magnetic pole position), and the position command is switched to the stop position command. Therefore, it is possible to provide the servo control apparatus that enables a sensorless controlled stop.

Second Embodiment

Figure 4:
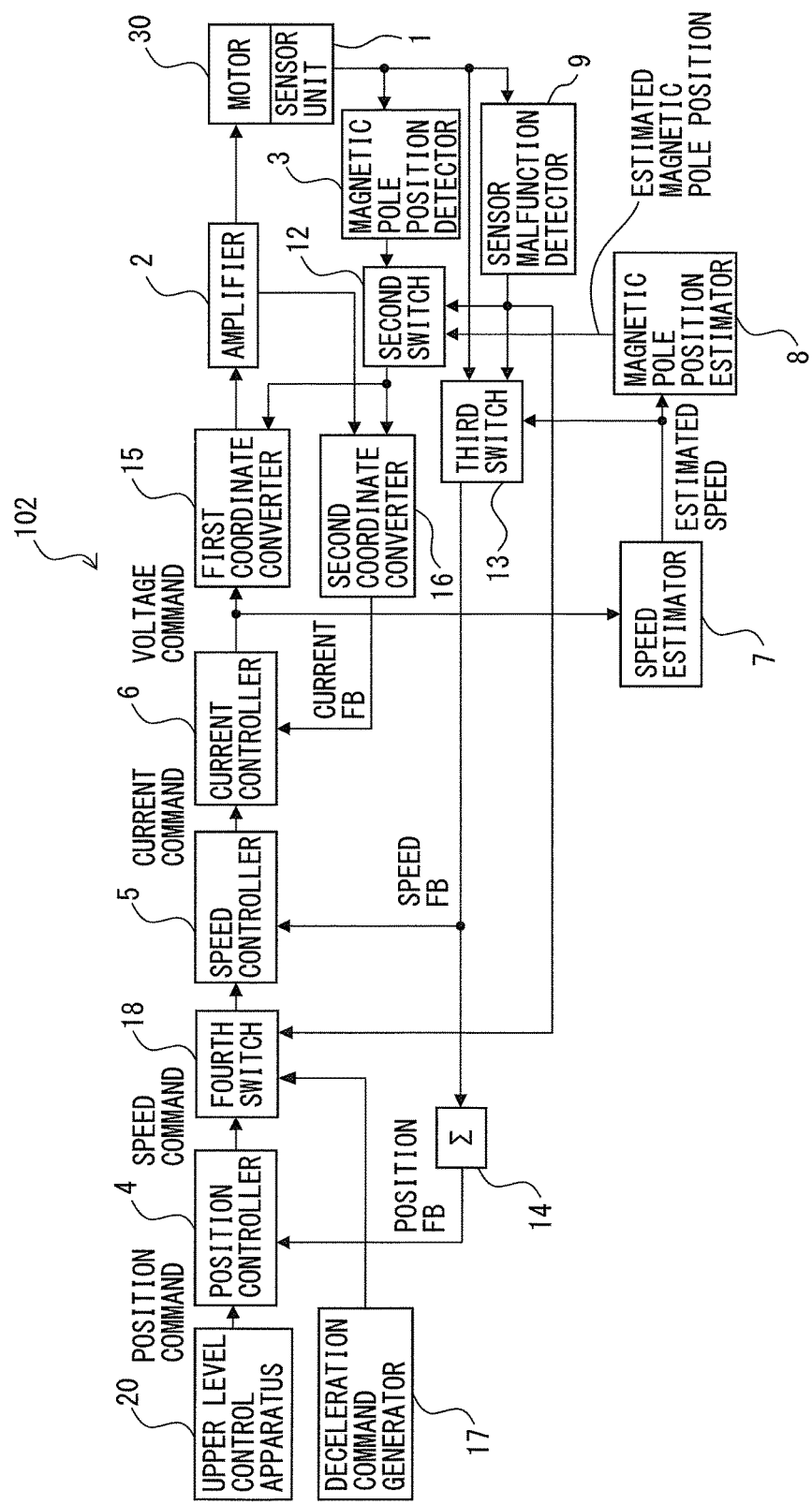
FIG. 4 is a configuration diagram of a servo control apparatus according to a second embodiment of the present invention.

Next, a servo control apparatus according to a second embodiment of the present invention will be described. FIG. 4 is a configuration diagram of the servo control apparatus according to the second embodiment of the present invention. The servo control apparatus 102 according to the second embodiment of the present invention is a servo control apparatus for controlling a servomotor installed in a machine tool or an industrial machine. The servo control apparatus 102 includes a sensor unit 1, an amplifier 2, a magnetic pole position detector 3, a position controller 4, a speed controller 5, a current controller 6, a speed estimator 7, a magnetic pole position estimator 8, a sensor malfunction detector 9, a deceleration command generator 17, a fourth switch 18, a second switch 12, and a third switch 13.

The sensor unit 1 detects the speed of a servomotor 30 and outputs the detected speed as speed feedback.

While driving the servomotor 30, the amplifier 2 feeds back a current flowing through the servomotor 30.

The magnetic pole position detector 3 detects the magnetic pole position of the servomotor 30.

The position controller 4 outputs a speed command based on a position command for the servomotor 30 from an upper level control apparatus 20 and the position of the servomotor 30 calculated from the speed detected by the sensor unit 1.

The speed controller 5 outputs a current command based on the speed command from the position controller 4 and the speed detected by the sensor unit 1.

The current controller 6 outputs a voltage command based on the current command from the speed controller 5 and the current detected by the amplifier 2.

The speed estimator 7 calculates an estimated speed based on the voltage command from the current controller 6.

The magnetic pole position estimator 8 calculates an estimated magnetic pole position based on the estimated speed from the speed estimator 7.

The sensor malfunction detector 9 detects a malfunction in the sensor unit 1.

The deceleration command generator 17 generates a deceleration command to decelerate the servomotor 30.

When the sensor malfunction detector 9 has detected the malfunction in the sensor unit 1, the fourth switch 18 switches from the speed command to the deceleration command.

When the sensor malfunction detector 9 has detected the malfunction in the sensor unit 1, the second switch 12 switches from the magnetic pole position to the estimated magnetic pole position.

When the sensor malfunction detector 9 has detected the malfunction in the sensor unit 1, the third switch 13 switches from the speed feedback to the estimated speed.

The difference of the servo control apparatus 102 according to the second embodiment from the servo control apparatus 101 according to the first embodiment is the provision of the fourth switch 18 (see FIG. 4) for switching from the speed command to the deceleration command when the sensor malfunction detector 9 has detected a malfunction in the sensor unit 1, instead of the first switch 11 (see FIG. 2) for switching from the position command to the stop position command when the sensor malfunction detector 9 has detected a malfunction in the sensor unit 1. Since the other configurations of the servo control apparatus 102 according to the second embodiment are the same as those of the servo control apparatus 101 according to the first embodiment, the detailed description thereof will be omitted.

In the servo control apparatus 102 according to the second embodiment of the present invention, when a malfunction has been detected in the sensor unit 1, the speed command is switched to the deceleration command. More specifically, when the sensor malfunction detector 9 has detected the malfunction in the sensor unit 1, the fourth switch 18 switches from the speed command to the deceleration command. When the sensor malfunction detector 9 has detected the malfunction in the sensor unit 1, the second switch 12 switches from the magnetic pole position to the estimated magnetic pole position. Moreover, when the sensor malfunction detector 9 has detected the malfunction in the sensor unit 1, the third switch 13 switches from the speed feedback to the estimated speed.

As described above, when the sensor malfunction detector 9 has detected the malfunction in the sensor unit 1, each of the switches 11, 12, and 18 operates as follows:

(1) The magnetic pole position estimator 8 calculates the estimated magnetic pole position based on the estimated speed. The second switch 12 is switched so as to use the estimated magnetic pole position instead of the detected magnetic pole position contained in sensor information.

(2) The third switch 13 is switched so as to use the estimated speed as the speed FB instead of the speed contained in the sensor information detected by the sensor unit 1. The integral of the estimated speed is used as position FB.

(3) The fourth switch 18 is switched so as to use the deceleration command generated by the deceleration command generator 17 instead of the speed command from the position controller 4.

Since there is possibly the difference between a phase $\theta_1$ from the sensor information and a phase $\theta_2$ from the estimated speed at the time of switching, it is preferable that concurrently with the switching to the estimated speed, the value of the phase $\theta_1$ is used as an initial value of an estimated phase.

Figure 5:
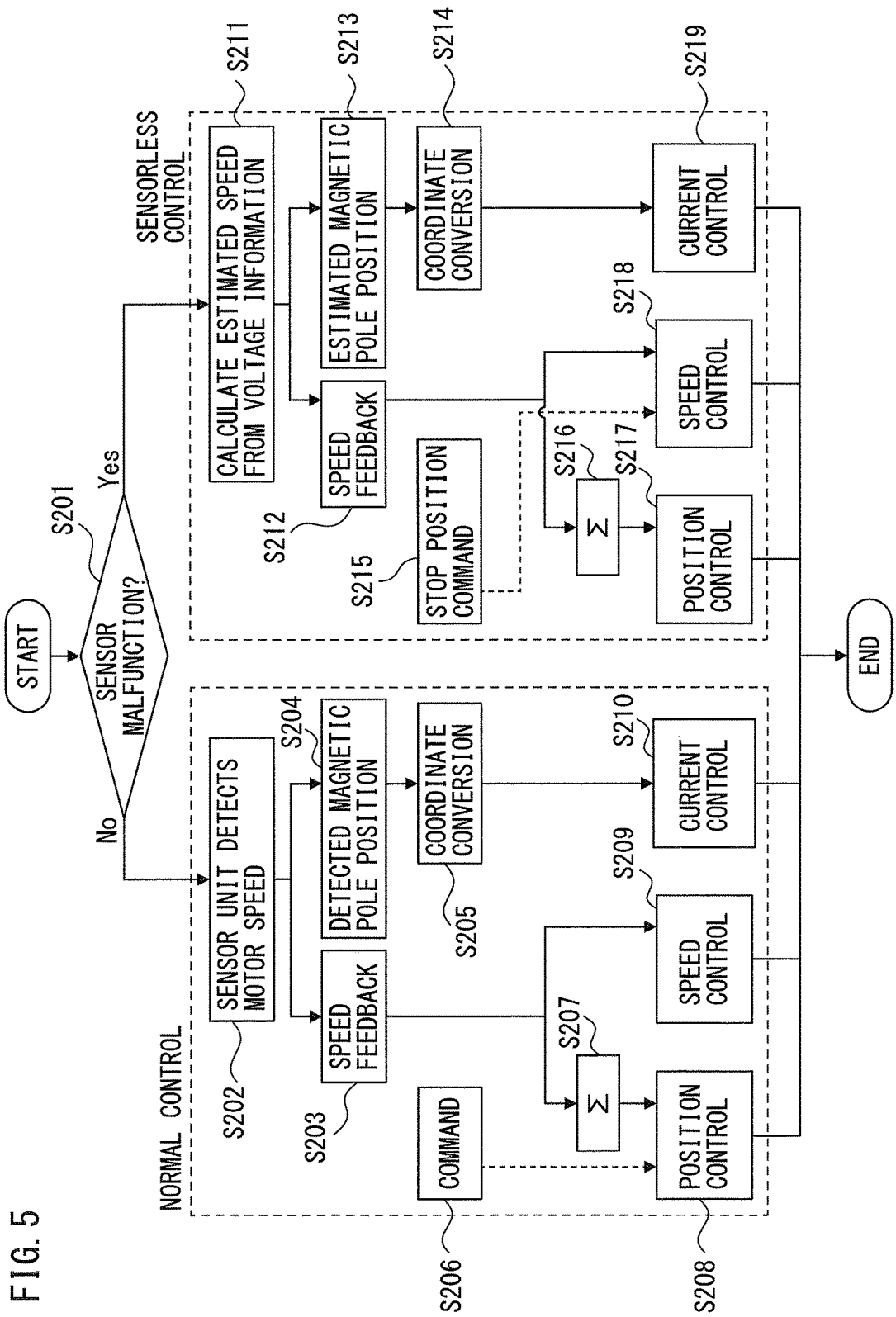
FIG. 5 is a flowchart that explains the operation process of the servo control apparatus according to the second embodiment of the present invention.

Next, the operation process of the servo control apparatus 102 according to the second embodiment of the present invention will be described with reference to a flowchart shown in FIG. 5.

First, in step S201, the sensor malfunction detector 9 (see FIG. 4) determines whether or not a malfunction occurs in the sensor unit 1. When no malfunction occurs in the sensor unit 1, normal servo control (normal control) is performed in steps S202 to S210. On the other hand, when the malfunction occurs in the sensor unit 1, sensorless control is performed in steps S211 to S219.

In the servo control apparatus 102 according to the second embodiment, since the normal control performed in steps S202 to S210 is the same as that performed by the servo control apparatus 101 according to the above first embodiment in steps S102 to S110 (see FIG. 3), the detailed description thereof will be omitted.

Next, the sensorless control performed by the servo control apparatus 102 according to the second embodiment of the present invention will be described. First, in step S211, the speed estimator 7 estimates a speed from a voltage command i.e. voltage information, and outputs the estimated speed. The outputted estimated speed is inputted to the third switch 13. In the sensorless control, the sensor malfunction detector 9 has detected the malfunction in the sensor unit 1, so that in step S212 the third switch 13 outputs the estimated speed to the speed controller 5 as speed FB.

In step S216, the estimated speed is inputted to an integrator 14 as the speed FB, and outputted therefrom as position FB. Then, in step S217, the position controller 4 performs position control based on a position command and the position FB. Furthermore, in step S215, the deceleration command generator 17 outputs a deceleration command to the fourth switch 18. In the sensorless control, the sensor malfunction detector 9 has detected the malfunction in the sensor unit 1, so that the fourth switch 18 outputs the deceleration command from the deceleration command generator 17 to the speed controller 5. Then, in step S218, the speed controller 5 performs speed control based on the deceleration command and the speed FB.

Also, in step S213, the magnetic pole position estimator 8 calculates an estimated magnetic pole position based on the estimated speed. The calculated estimated magnetic pole position is inputted to the second switch 12. In the sensorless control, the sensor malfunction detector 9 has detected the malfunction in the sensor unit 1, so that the second switch 12 outputs the estimated magnetic pole position to the second coordinate converter 16. Next, in step S214, the second coordinate converter 16 performs a coordinate conversion from a three-phase current into a dq current. Then, in step S219, the current after being subjected to the coordinate conversion is inputted to the current controller 6 as current FB, and current control is performed. The sensorless control is performed in this manner.

As described above, according to the servo control apparatus of the second embodiment of the present invention, even in the event of the sensor malfunction, the speed of the motor is estimated from the voltage information to use the value of the estimated speed instead of the sensor information (position, speed, and magnetic pole position), and the speed command is switched to the deceleration command. Therefore, it is possible to provide the servo control apparatus that enables a sensorless controlled stop.

Third Embodiment

Figure 6:
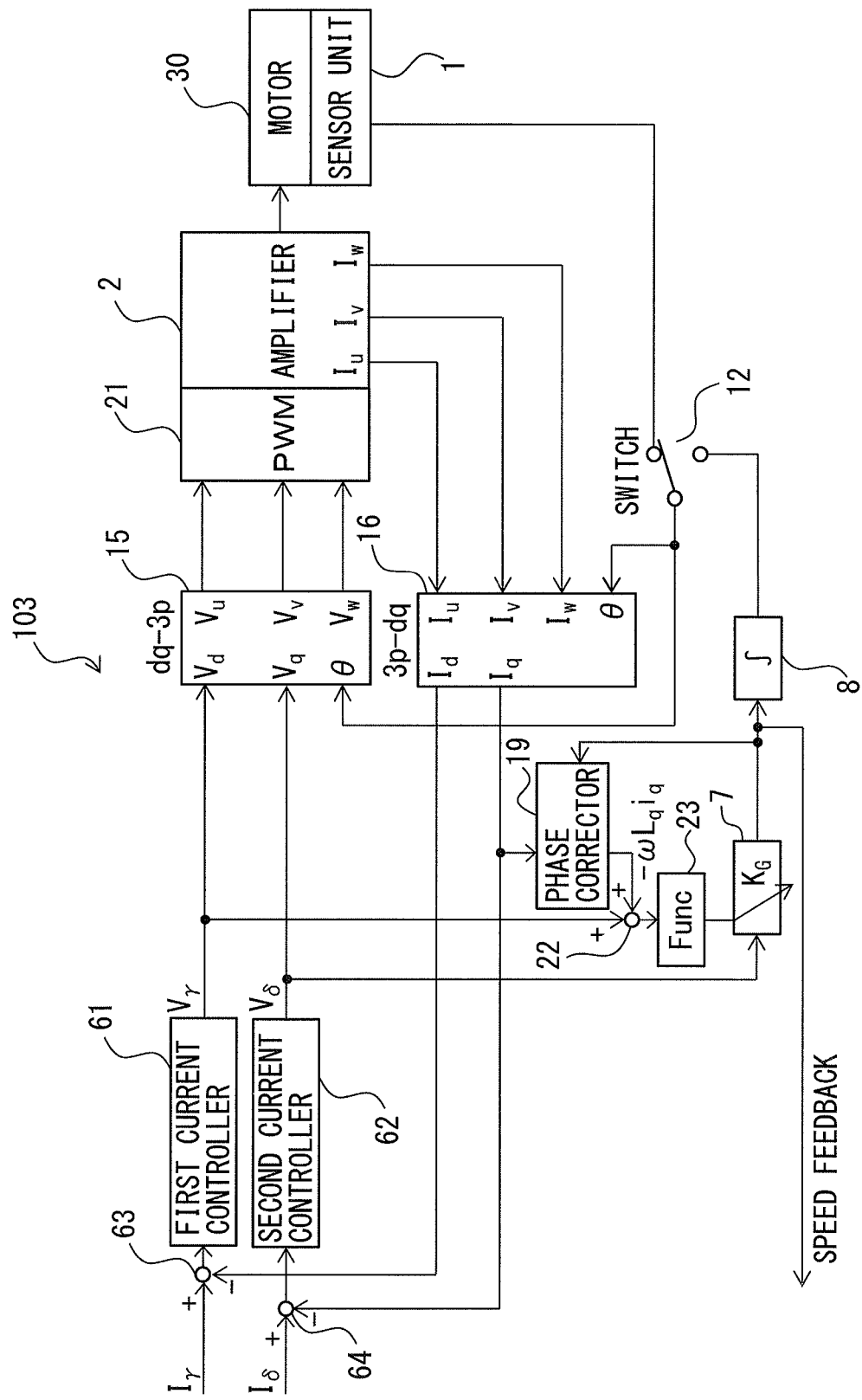
FIG. 6 is a configuration diagram of a servo control apparatus according to a third embodiment of the present invention.

Next, a servo control apparatus according to a third embodiment of the present invention will be described. FIG. 6 is a configuration diagram of the servo control apparatus according to the third embodiment of the present invention. The difference of the servo control apparatus 103 according to the third embodiment of the present invention from the servo control apparatus 101 according to the first embodiment is the further provision of a phase corrector 19 for correcting a phase based on an estimated speed, an inductance, and a Q-phase current to improve a power factor. Since the other configurations of the servo control apparatus 103 according to the third embodiment is the same as those of the servo control apparatus 101 according to the first embodiment, the detailed description thereof will be omitted.

In FIG. 6, a first current controller 61 and a second current controller 62 receive an input of current commands $I_\gamma$ and $I_\delta$ and output voltage commands $V_\gamma$ and $V_\delta$, respectively. The outputted voltage commands $V_\gamma$ and $V_\delta$ are inputted as a d-phase voltage $V_d$ and a q-phase voltage $V_q$, respectively, to a first coordinate converter 15 to perform a dq to three-phase (dq-3p) conversion.

The first coordinate converter 15 converts the d-phase voltage $V_d$ and the q-phase voltage $V_q$ into a U-phase voltage $V_u$, a V-phase voltage $V_v$, and a W-phase voltage $V_w$ using an angle θ detected by a sensor unit 1. The U-phase voltage $V_u$, the V-phase voltage $V_v$, and the W-phase voltage $V_w$ are inputted to a PWM controller 21, and then inputted to an amplifier 2 to drive a motor 30.

A U-phase current $I_u$, a V-phase current $I_v$, and a W-phase current $I_w$ flowing through the amplifier 2 are inputted to a second coordinate converter 16 to perform a three-phase to dq (3p-dq) conversion, and converted into currents $I_d$ and $I_q$. The converted currents $I_d$ and $I_q$ are inputted to a first adder 63 and a second adder 64, respectively, as current feedback. Furthermore, the current $I_q$ is inputted to the phase corrector 19, and the following phase correction is performed therein.

Conventionally, sensorless control using voltage information is premised on $V_\gamma=0$ and $I_\gamma=0$. On the other hand, a voltage equation in a steady state is expressed by the following expression.

$$\begin{bmatrix} V_d \\ V_q \end{bmatrix} = \begin{bmatrix} 0 & -\omega L_q \\ \omega L_d & 0 \end{bmatrix} \begin{bmatrix} i_d \\ i_q \end{bmatrix} + \begin{bmatrix} 0 \\ \omega K_\varphi \end{bmatrix}$$

Wherein, $L_d$ represents a d-phase inductance, $L_q$ represents a q-phase inductance, $K_\varphi$ is a coefficient, and ω is a speed. The speed ω is calculated by the speed estimator 7 using $\omega = K_G V_\delta$ from the voltage command $V_\delta$ and a coefficient $K_G$.

In the steady state, the following component depending on a q-phase current ($I_q$) originally remains in $V_d$.

$$V_d = \omega L_q i_q \qquad (1)$$

In control based on $V_d=0$, since the above component could cause a reduction in a power factor, the correction of this component brings about an improvement in the power factor. To be more specific, as shown in FIG. 6, the phase corrector 19 is further provided to add $-\omega L_q i_q$ to $V_\gamma$, which is used for generating the estimated speed, for correction. The value of ($-\omega L_q i_q$) outputted from the phase corrector 19 is inputted to an adder 22. The output of the adder 22 is inputted to a coefficient controller 23 to control the coefficient $K_G$.

Figure 7A:
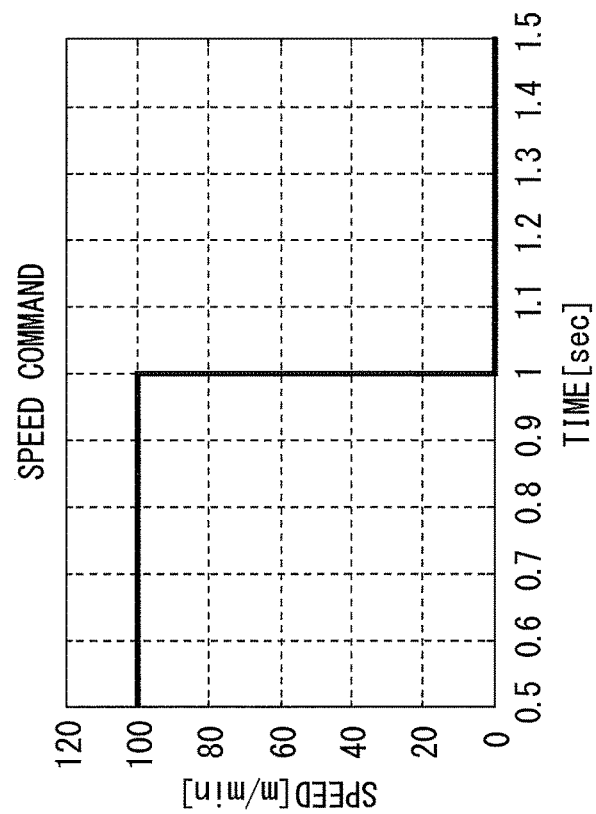
FIG. 7A is a graph showing a variation in a speed command with time when a phase correction according to a conventional technique is performed.
Figure 7B:
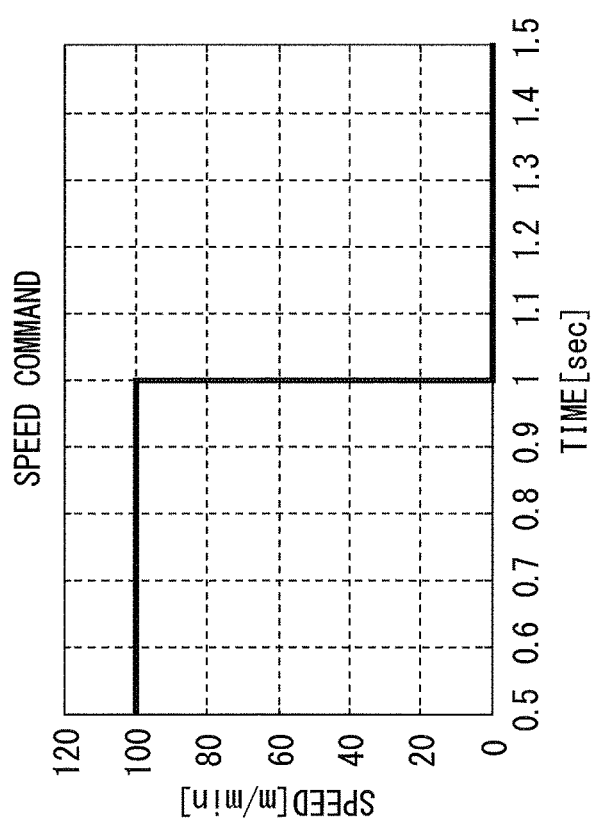
FIG. 7B is a graph showing a variation in a speed command with time when a phase correction according to the third embodiment of the present invention is performed.
Figure 9A:
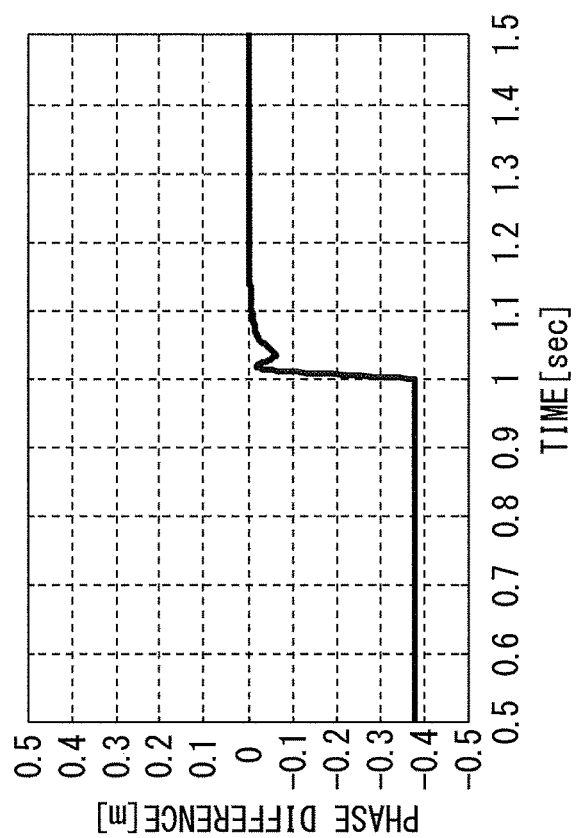
FIG. 9A is a graph showing a variation in the difference between a motor phase and an estimated phase with time when the phase correction according to the conventional technique is performed.
Figure 9B:
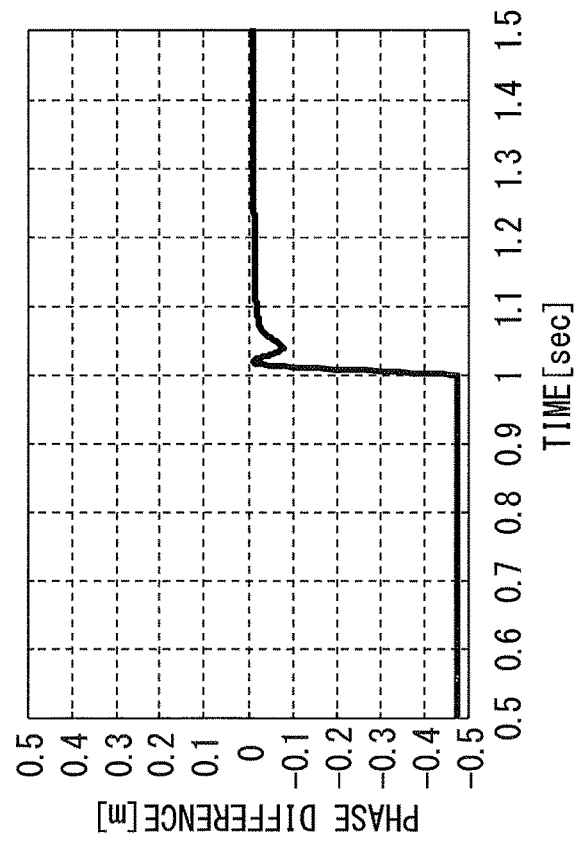
FIG. 9B is a graph showing a variation in the difference between a motor phase and an estimated phase with time when the phase correction according to the third embodiment of the present invention is performed.

Next, the effects of the servo control apparatus 103 according to the third embodiment of the present invention will be described. FIG. 7A shows a variation in a speed command with time, FIG. 8A shows a variation in a motor speed with time, and FIG. 9A shows a variation in the difference between a motor phase and an estimated phase with time, in a case where a sensor is used according to a conventional technique. FIG. 7B shows a variation in a speed command with time, FIG. 8B shows a variation in a motor speed with time, and FIG. 9B shows a variation in the difference between a motor phase and an estimated phase with time, in the sensorless control in which the servo control apparatus 103 according to the third embodiment of the present invention makes a correction using $-\omega L_q i_q$. It is noted that to evaluate effects on an improvement in a power factor, comparison is made on the precondition that control using an estimated speed is performed even in operation at a constant speed.

In an example, as shown in FIGS. 7A and 7B, the speed commands change from 100 [m/min] to 0 [m/min] at a time 1 [sec]. As a result of this, as shown in FIGS. 8A and 8B, the motor speeds gradually decrease from 100 [m/min] to 0 [m/min] after the time 1 [sec]. On the other hand, as is apparent from the comparison between FIGS. 9A and 9B, the difference between the motor phase and the estimated phase is smaller in the control using the phase correction.

As described above, the phase correction by the servo control apparatus 103 of the third embodiment of the present invention serves to improve a power factor.

It is noted that the inductance $L_q$ is preferably estimated based on a speed, a current, and a voltage during a constant speed operation before detecting a malfunction. Although the phase correction serves to improve a power factor, as described above, the phase correction requires the value of the inductance $L_q$, that is, a motor constant. The physical constants of an object to be controlled are not always known in any system. Thus, in order to configure a generally robust system, the phase correction is desired to be independent of a variation in the motor constant.

On the other hand, the inductance $L_q$ is represented by the above expression (1). Therefore, the inductance $L_q$ of a system can be estimated in advance by capturing a state of the constant speed operation and measuring a voltage value, a current value, and a speed, while the sensor unit 1 normally operates. The use of the estimated inductance $L_q$ allows applying the above-described method for improving a power factor without determining any physical constant.

Moreover, when the voltage information outputted from the current controller is less than a predetermined threshold, even if a sensor malfunction detector has detected a malfunction in the sensor unit 1, a controlled stop is preferably not performed but switched to a stop using a dynamic brake (DB) resistor.

The sensorless control using the voltage information takes advantage of an electromotive voltage during the rotation of the motor. However, it is believed that a reduction in the electromotive voltage at a low speed makes it difficult to correctly estimate a magnetic pole position. In such a state of having a sufficiently low speed, however, since kinetic energy is reduced too, stopping a motor by the DB is a rather reliable and safe stopping method. More specifically, it is preferable to provide a switching means for switching to stopping by the DB, when an estimated speed is lower than a certain threshold.

According to the servo control apparatuses of the embodiments of the present invention, it is possible to provide a servo control apparatus that can perform a controlled stop, even in the event of a sensor malfunction, by estimating a motor speed from voltage information and using the value of the motor speed instead of sensor information (position, speed, and magnetic pole position). Since the stop follows a stop position command or a deceleration command, stopping distance is shortened compared with a conventional stop using a DB resistor, thus preventing damage to a machine and improving safety in the event of a sensor malfunction.

What is claimed is:

1. A servo control apparatus for controlling a servomotor installed in a machine tool or an industrial machine, comprising: a sensor unit for detecting a speed of the servomotor and outputting the speed as speed feedback; an amplifier for driving the servomotor, and feeding back a current flowing through the servomotor; a magnetic pole position detector for detecting a magnetic pole position of the servomotor; a position controller for outputting a speed command based on a position command for the servomotor and a position of the servomotor calculated from the detected speed; a speed controller for outputting a current command based on the speed command and the detected speed; a current controller for outputting a voltage command based on the current command and the detected current; a speed estimator for calculating an estimated speed based on the voltage command; a magnetic pole position estimator for calculating an estimated magnetic pole position from the estimated speed; a sensor malfunction detector for detecting a malfunction in the sensor unit; a stop position command generator for generating a stop position command to stop the servomotor; a first switch for switching from the position command to the stop position command, when the sensor malfunction detector has detected the malfunction in the sensor unit; a second switch for switching from the magnetic pole position to the estimated magnetic pole position, when the sensor malfunction detector has detected the malfunction in the sensor unit; and a third switch for switching from the speed feedback to the estimated speed, when the sensor malfunction detector has detected the malfunction in the sensor unit.

2. The servo control apparatus according to claim 1, further comprising a phase corrector for performing a phase correction based on the estimated speed, an inductance, and a Q-phase current to improve a power factor.

3. The servo control apparatus according to claim 2, wherein the inductance is estimated based on a speed, a current, and a voltage during a constant speed operation before detecting the malfunction.

4. The servo control apparatus according to claim 1, wherein when voltage information outputted from the current controller is less than an established threshold, even if the sensor malfunction detector has detected the 25 malfunction, a controlled stop is not performed but switched to a stop using a dynamic brake resistor.

* * * * *